(12) United States Patent
da Vitoria Lobo et al.

(10) Patent No.: US 7,983,448 B1
(45) Date of Patent: Jul. 19, 2011

(54) SELF CORRECTING TRACKING OF MOVING OBJECTS IN VIDEO

(75) Inventors: Niels da Vitoria Lobo, Winter Park, FL (US); Mehmet B Caglar, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1090 days.

(21) Appl. No.: 11/753,233

(22) Filed: May 24, 2007

Related U.S. Application Data (60) Provisional application No. 60/810,284, filed on Jun. 2, 2006.

(51) Int. Cl.
G06K 9/00 (2006.01)
G06K 9/46 (2006.01)
G06K 9/66 (2006.01)
G06K 9/62 (2006.01)

(52) U.S. Cl. ........ 382/103; 382/107; 382/190; 382/199; 382/224; 382/225; 382/226; 382/227

(58) Field of Classification Search .................. 382/103, 382/107, 190, 199, 224, 225, 226, 227
See application file for complete search history.

(56) References Cited

U.S. PATENT DOCUMENTS

| | | | | |
|---|---|---|---|---|
| 6,263,089 B1 * | 7/2001 | Otsuka et al. | ................. | 382/107 |
| 6,597,800 B1 * | 7/2003 | Murray et al. | ................. | 382/103 |
| 7,068,842 B2 * | 6/2006 | Liang et al. | ................. | 382/181 |
| 7,200,266 B2 * | 4/2007 | Ozer et al. | ..................... | 382/173 |
| 7,280,676 B2 * | 10/2007 | Miura et al. | ................... | 382/115 |
| 7,426,301 B2 * | 9/2008 | Porikli | .......................... | 382/181 |
| 7,565,295 B1 * | 7/2009 | Hernandez-Rebollar | ..... | 704/271 |
| 7,567,203 B2 * | 7/2009 | Dizaji et al. | ..................... | 342/90 |
| 2002/0165839 A1 * | 11/2002 | Taylor et al. | ..................... | 706/20 |
| 2004/0120581 A1 * | 6/2004 | Ozer et al. | ..................... | 382/224 |
| 2005/0271279 A1 * | 12/2005 | Fujimura et al. | .............. | 382/203 |
| 2008/0031491 A1 * | 2/2008 | Ma et al. | ....................... | 382/103 |

OTHER PUBLICATIONS

Pavlovic, et al. "Visual Interpretation of Hand Gestures for Human-Computer Interaction: A Review." Pattern Analysis and Machine Intelligence, IEEE Transactions on . 19.7 (1997): 677-695. Print.*
Stenger, (2004). Model-based hand tracking using a hierarchical Bayesian filter. Informally published manuscript, St. John's College, University of Cambridge, Cambridge, UK.*
Quinlan. "Learning Decision Tree Classifiers." ACM Computing Surveys. 28.1 (1996): 71-72. Print.*
Cagier, et al. "Self Correcting Tracking for Articulated Objects." Automatic Face and Gesture Recognition, 2006. FGR 2006. 7th International Conference on . (2006): 609-616 . Print.*

(Continued)

*Primary Examiner* — Matthew C Bella
*Assistant Examiner* — Michael A Newman
(74) *Attorney, Agent, or Firm* — Brian S. Steinberger; Phyllis K. Wood; Law Offices of Brian S. Steinberger, P.A.

(57) ABSTRACT

Apparatus, methods, systems and devices for identifying and tracking a human hand in a video. The steps for identifying the hand includes detecting parallel lines (bars), detecting curved fingertips (curves), grouping the detected parallel lines and curved fingertips according to a parallel line decision tree and a curved fingertip decision tree, respectively, and merging the parallel line group and the curved fingertip group to identify candidate hands.

19 Claims, 9 Drawing Sheets

OTHER PUBLICATIONS

Amer, Aishy. "Voting-Based Simultaneous Tracking of Multiple Video Objects." IEEE Transactions on Circuits and Systems for Video Technology. 15.11 (2005): 1448-1462. Print. Geman, et al. "Joint Induction of Shape Features and Tree Classifiers." IEEE Trans. PAMI. 19. (1997): 2-18. Print.*

Rhee, et al. "Human Hand Modeling from Surface Anatomy." Proceedings of the 2006 symposium on Interactive 3D graphics and games. (27-34): 2006. Print.*

Lin, et al. "Hand Tracking using Spatial Gesture Modeling and Visual Feedback for A Virtual DJ System." Proceedings of the Fourth IEEE Int. Conf on Multimodal Interfaces (ICMI'02). (2002): 197-202. Print.*

Armstrong, et al. "Robust Object Tracking." Asian Conference on Computer Vision. 1. (1995): 58-61. Print.*

Zhong, et al. "Video Object Model and Segmentation for Content-Based Video Indexing." Circuits and Systems, 1997. ISCAS '97., Proceedings of 1997 IEEE International Symposium on . 2. (1997): 1492-1495. Print.*

Collins et al. (2003). On-Line Selection of Discriminative Tracking Features. Carnegie Mellon University, Pittsburgh, PA.*

Edward Lin, et al. "Hand Tracking Using Spatial Gesture Modeling and Visual Feedback for a Virtual DJ System" Proceedings of the Fourth IEEE International Conf. on Multimodal Interfaces (ICMI'02) 2002, 6 pages.

Justin Garcia, et al. "Automatic Detection of Heads in Colored Images" Proceedings of the Second Canadian Conf. on Computer and Robot Vision (CRV'05) IEEE, 6 pages, (2005).

Romer Rosales, et al. "3D Hand Pose Reconstruction Using Specialized Mappings" IEEE International Conf. on Computer Vision (ICCV), Canada, Jul. 2001, 8 pages.

Quan Yuan, "Automatic 2D Hand Tracking in Video Sequences" Seventh IEEE Workshops on Application of Computer Vision (WACV/MOTION'05)—vol. 1, 2005, pp. 250-256.

Lars Bretzner, et al., "Hand Gesture Recognition using Multi-Scale Colour Features, Hierarchical Models and Particle Filtering" Proceedings, Fifth IEEE International Conference, 2002, 7 pages, Washington, D.C.

Mathias Kolsch, et al. "Robust Hand Detection" In Proc. IEEE Intl. Conference on Automatic Face and Gesture Recognition, May 2004. 6 pages.

Dorin Comaniciu, et al., "Mean Shift: A Robust Approach Toward Feature Space Analysis" IEEE Transactions On Pattern Analysis and Machine Intelligence, vol. 24, No. 5, May 2002, pp. 603-619.

Vladimir I. Pavlovic, et al. "Visual Interpretation of Hand Gestures for Human-Computer Interaction: A Review" IEEE Transactions on Pattern Analysis and Machine Intelligence, (1997) vol. 19, No. 7, 34 pages.

James M. Rehg, et al., "Visual Tracking of High DOF Articulated Structures: an Application to Human Hand Tracking" Proceedings of the 3rd European Conference on Computer Vision (ECCV '94), vol. II, May 1994, pp. 35-46.

B. Stenger, et al. "Hand Pose Estimation Using Hierarchical Detection" Lecture Notes in Computer Science, Publisher: Springer Berlin/Heidelberg, ISSN 0302-9743, vol. 3058/2004, Book: Computer Vision In Human-Computer Interaction, May 12, 2004, 11 pages.

B. Stenger, et al. "Model-Based Hand Tracking Using a Hierarchical Bayesian Filter" Paper submitted to St. John's College, Mar. 2004 University of Cambridge, This paper appears in: Pattern Analysis and Machine Intelligence, IEEE Transactions on Sep. 2006, vol. 28, Issue: 9 on pp. 1372-1384, 14 pages.

C. Tomasi et al. "Detection and tracking of point features" Technical Report CMU-CS-91-132, Carnegie Melon University, Apr. 1991.

Ying Wu, et al., "View-independent Recognition of Hand Postures" In Proc. Intl. Conf. Computer Vision and Pattern Recognition, (2000) pp. 2088-2094.

T. Zhao, et al. "Stochastic Human Segmentation from a Static Camera" In Proc. IEEE work. Motion and Video Computing, pp. 9-14, 2002.

* cited by examiner

SELF CORRECTING TRACKING OF MOVING OBJECTS IN VIDEO

The application claims the benefit of priority to U.S. Provisional Patent Application No. 60/810,284 filed on Jun. 2, 2006.

Funded in part by U.S. Government Advanced Research Development Agency Video Analysis and Content Exploitation (ARDA VACE) Contract No. 16408035.

FIELD OF THE INVENTION

This invention relates to video surveillance and, in particular, to methods, systems, apparatus and devices for identifying and tracking of moving objects including human hands in video for uses such as human computer interaction applications, surveillance, gesture recognition and understanding human-human interactions.

BACKGROUND AND PRIOR ART

Tracking in unconstrained and cluttered environments is a difficult task, especially when the object of interest is articulated. When a tracker fails, re-initialization is needed. In systems that are not self initialized, the initial structure from the manual initialization is assumed to be preserved over time for self correction. Even if an online model of the object is kept, it is not easy to determine automatically if the tracking has failed and when.

Tracking has been a well researched area in computer vision. There are numerous tracking systems such as Kanade-Lucas-Tomasi (KLT) Feature Tracker described in C. Tomasi and T. Kanade, Detection and tracking of point features, Technical Report CMU-CS-91-132, Carnegie Mellon University (April 1991) and mean shift approach described in D. Comaniciu and P. Meer, Mean shift: A robust approach toward feature space analysis, Pattern Analysis and Machine Intelligence, 24(5):603-619, (2002). The common problems of the prior art algorithms is initialization and self-correction.

Another problem with prior art detectors is that they have a high number of false positives (approximately 2 false positives per detection) and detection is not possible in some frames due to self occlusion and inability to detect the object of interest, such as finger primitives in low resolution images. Hand tracking is important in many applications including HCI, surveillance, gesture recognition and understanding human-human interactions. Prior art systems fail to track hands in uncontrolled environments, limiting them to simple gesture recognition problems with uniform background. In these systems, initialization usually comes from stationary hands in the system either by observing the hand for a short time frame, building pre-computed skin color histogram by training or manual initialization. Most prior art systems are unable to recover when the tracking fails.

Although some prior art describes methods for hand detection alone, such as the methods described in M. Kolsch and M. Turk. Robust hand detection. In Proc. Intl. Conf. Hand and Gesture Recognition, (2004) pp. 614-619 and Q. Yuan, S. Sclaroff, and V. Athitsos, Automatic 2d hand tracking in video sequences, In Proc. IEEE work, Motion and Video Computing, (2005) pp. 250 256, in most prior art systems the hand location is accepted as known or found through simple skin detection.

The skin detector is either trained on the skin color that is obtained from the face R. Rosales, V. Athitsos, L. Sigal, and S. Sclaroff. 3d hand pose reconstruction using specialized mappings, In Proc. Intl. Conf. Computer Vision, (2001), pp. 378-387, or as in the more frequent case, on skin color extracted from the training images as described in Bretzner et al, Hand gesture recognition using multi-scale color features, hierarchical models and particle filtering, In Proc. Intl. Conf. Hand and Gesture Recognition, pp. 423-428, (2002). However, the prior art systems fail under poor lighting conditions or when tracking skin colors that they are not trained for.

Aside from many systems that employ skin color based hand detection V. I. Pavlovic, R. Sharma, and T. Huang, Visual interpretation of hand gestures for human-computer interaction: A review. Pattern Analysis and Machine Intelligence, pp. 677-695, (1997); Rosales et al., 3d Hand pose reconstruction using specialized mappings, In. Proc. Intl. Conf. Computer Vision, (2001), pp. 378-387; and Y. Wu and T. Huang, View-independent recognition of hand postures, In Proc. Intl. Conf. Computer Vision and Pattern Recognition, (2000), pp. 2088-2094 there are few systems that operate in an appearance-based detection framework.

Kolsch and Turk discribed a system for detecting hands based on Ada-Boost. Their approach is view-specific and limited to a few postures of the hand. Yuan disclosed a hand detector, where detection of the hand successfully depends on continuous movement of the hands, therefore requires video as input. Moreover, in this video the hand posture is required to change, such that there is no correspondence between the hand regions among the frames that are being compared. Bretzner et al. use a hand detector before recognizing the hand posture; however their system performs poorly if a prior on skin color is not used.

Stenger et. al. applies hand detection and tracking in the same framework B. Stenger. Model-Based Hand Tracking Using A Hierarchical Bayesian Filter. PhD thesis, University of Cambridge, Cambridge, UK, (March 2004) and B. Stenger, A. Thayananthan, P. H. S. Torr, and R. Cipolla. Hand pose estimation using hierarchical detection. In Proc. Intl. work. Human Computer Interaction, (2004) pp. 105-116, but the detection is limited to both specific skin color and a hand pose. Another method for tracking is accomplished by building a 3-D model of the hand as described by Lin et. al. Hand tracking using spatial gesture modeling and visual feedback for a virtual dj system. In Proc. Fourth intl. conf. Multimodal Interfaces, (2002), pp. 197-202, also applies detection and tracking, but skin color is used to extract the hand, thus reducing generality.

Moreover, the hand is assumed to extend from the right hand side of the image, and assumed to exist in the scene. They use "U" shaped fingertip patterns to detect fingertips in already detected hands. Another hand tracker to mention is disclosed by Rehg et. al., Visual tracking of high dof articulated structures: An application to human hand tracking, In Proceedings of the 3rd European Conference on Computer Vision (ECCV '94), volume II, (May 1994), pp. 35-46 where the authors describe methods and systems that track simple features of the hand instead of tracking the hand in its entirety. However, they use a simple background for tracking.

SUMMARY OF THE INVENTION

A primary objective of the invention is to provide new methods, systems, apparatus and devices for identifying the location of open hands in video for use in tracking moving hands.

A secondary objective of the invention is to provide new methods, systems, apparatus and devices for identifying and tracking of moving objects including human hands in video using primitives corresponding to the object being tracked.

A third objective of the invention is to provide new methods, systems, apparatus and devices that employing finger-tip curve finders and detectors of tubular shapes that resemble fingers to locate open hands in video.

A fourth objective of the invention is to provide new methods, systems, apparatus and devices that use a competition strategy to propagate fingertip identification information across frames of a video.

A fifth objective of the invention is to provide new methods, systems, apparatus and devices to provide simple hand tracking without the need for training for skin color.

A sixth objective of the invention is to provide new methods, systems, apparatus and devices that eliminates the false positives while filling in the missed detections by calculating the most probable track the hand is likely to have followed.

A seventh objective of the present invention is to provide new methods, systems, apparatus and devices for a self initializing and self correcting tracking technique that is robust to different skin color, illumination and shadow irregularities.

An eighth objective of the present invention is to provide new methods, systems, apparatus and devices for tracking that is well suited to uncontrolled environments for successfully tracking detected objects in the sequence where detection does not necessarily have to be successful in each frame observed.

A ninth objective of the present invention is to provide new methods, systems, apparatus and devices for tracking hands by first finding the finger primitives in the image then combines them to find possible hands. This enables it to be more generic and not dependent on skin color. Then tracking is done by dividing the motion into two components as local and global motion and recomputing the hand features at each frame.

A first embodiment provides a method for detection and tracking of a moving object including the steps of detecting at least two primitive classes for identifying the moving object within plural frames of video to generate plural primitive candidates for each class, grouping each detected primitive candidates in each class separately according to a decision tree corresponding to each primitive class, merging primitive groups for each class of primitives to identify the object being tracked, and tracking the object through the plural frames according to the merged primitive groups. The detecting step includes detecting plural primitives candidates for one of the primitive classes, extracting a parameter of a model of the one of the primitive classes, superimposing the primitive model parameter on each primitive candidate of the class and comparing each primitive candidate to the primitive model to determine which primitive candidate is a primitive.

Once the primitive candidates have been detected, they are grouped. The grouping step includes creating one group for each detected primitive candidate in each class to generate plural groups of primitives candidates for each primitive class using the decision tree corresponding to the primitive class, determining group membership of each of the plural groups from the plural primitive candidates detected in the detecting step, voting to eliminate primitive groups based on voting results and eliminating subset groups and small groups to reduce false primitive positives. The grouping step yields primitive candidates locations for each primitive class. In a next step, the primitive groups of a first class are merged with primitive groups of the second class and it is determined which merged groups include the object. For the groups having the detected object, the object is tracked through the plural frames by tracking the object forward and backward through each of plural sets of video frames to obtain plural trajectories of the object, recording each of the plural trajectories, merging the plural trajectories, assigning weights to each of the merged trajectories, generating a trajectory histogram from the merged trajectories and lastly, extracting and separating the hands from the trajectory histogram.

A second embodiment of the invention provides a method for detection and tracking of moving hands in a video. First parallel line primitives and curved fingertip primitives are detected then the parallel line primitives are grouped according to a line decision tree and curved fingertip primitive according to a fingertip decision tree. The parallel line groups and curved fingertip groups are merged to identify the hand and the hand is tracked through the plural frames according to the merged primitive groups.

The hands are tracked through a series of video frames by tracking the object forward and backward through each of plural sets of video frames to obtain plural trajectories of the object, recording each of the plural trajectories, merging the plural trajectories, assigning weights to each of the merged trajectories, generating a trajectory histogram from the merged trajectories and extracting and separating the hands from the trajectory histogram.

Further objects and advantages of this invention will be apparent from the following detailed description of preferred embodiments which are illustrated in the accompanying drawings.

BRIEF DESCRIPTION OF THE FIGURES

FIG. 2b is a flow diagram of the steps for grouping parallel lines and fingertip curves as shown in FIG. 2a.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
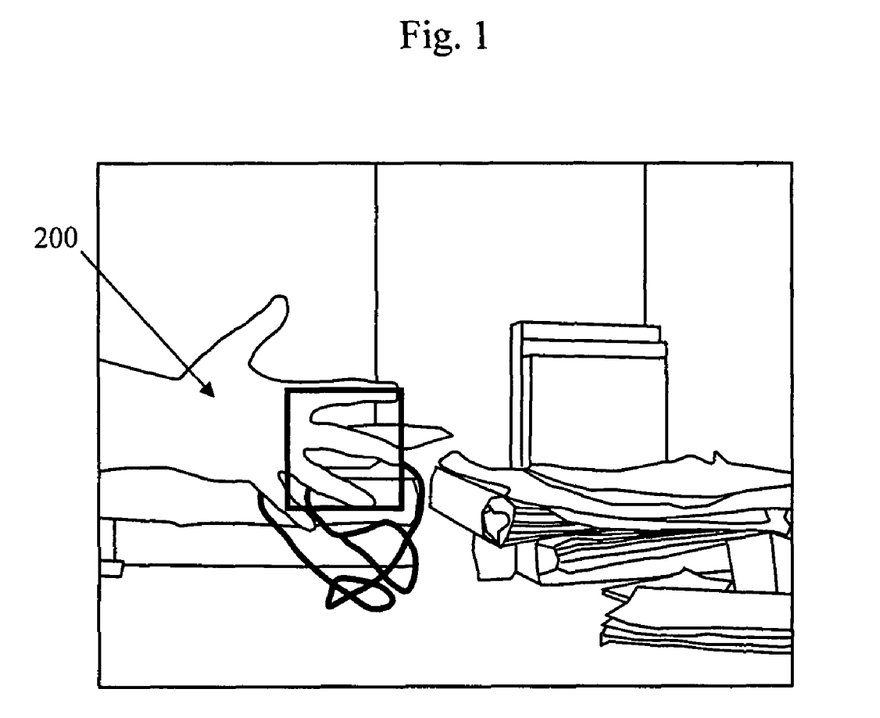
FIG. 1 shows a hand that is detected in a cluttered background.

The following is a list of designators used throughout the description to identify elements shown in the drawings.
200 hand
210 parallel lines
220 fingertip curves
300 background The apparatus, methods, systems and devices of the present invention solves the prior art initialization and self-correction problems with an approach that exploits the fact that video is available in its entirety and there exists a weak detector that finds an object of interest in a number of frames. For the purpose of illustration, and not limitation, the novel technique disclosed in this application is applied to hand tracking. Hands 200 are articulated objects with high degree of freedom, and they are hard to detect in cluttered backgrounds 300 such as the background shown in FIG. 1 and FIG. 6.

Hand detection is a preliminary step to a number of applications including HCI, surveillance, gesture recognition, hand tracking and understanding human-human interactions. In regard to hand tracking, the present invention solves the false-positive while filling in missed detections by calculating the most probable track the hand is likely to have followed. The system finds the globally optimum track for the hands by looking at the video in its entirety. If the detection of the hand is successfully carried out in some of the frames in the video, then the missing pieces are completed according to the tracking. In other words, the system finds the hands individually in each frame and the output of the tracking is used to fill in when the detection fails. The tracking method and system of the present invention is well suited to uncontrolled environments to successfully track detected objects in the sequence where detection does not necessarily have to be successful in each frame observed. False detections are also handled automatically, as long as they do not persist over time as is the general case.

The apparatus, methods and systems provide a self initializing and self correcting tracking technique that is robust to different skin color, illumination and shadow irregularities. Self initialization is achieved from a detector that has relatively high false positive rate. The detected hands are then tracked backwards and forward in time using mean shift trackers initialized at each hand to find the candidate tracks for possible objects in the test sequence. Observed tracks are merged and weighed to find the real trajectories. Simple actions are inferred extracting each object from the scene and interpreting their locations within each frame. Extraction is possible using the color histograms of the objects built during the detection phase. Applying the technique according the present invention to simple hand tracking had good results, without the need for training for skin color.

Hand detection is an essential component in initialization and self correction. The method, system, apparatus and device of the present invention provides an algorithm that uses finger primitives to detect hands in each frame. Currently there are two primitive classes of interest: parallel lines referred to as bars 210 that are the edges of a finger and the curved fingertip referred to as curves 220.

Figure 2A:
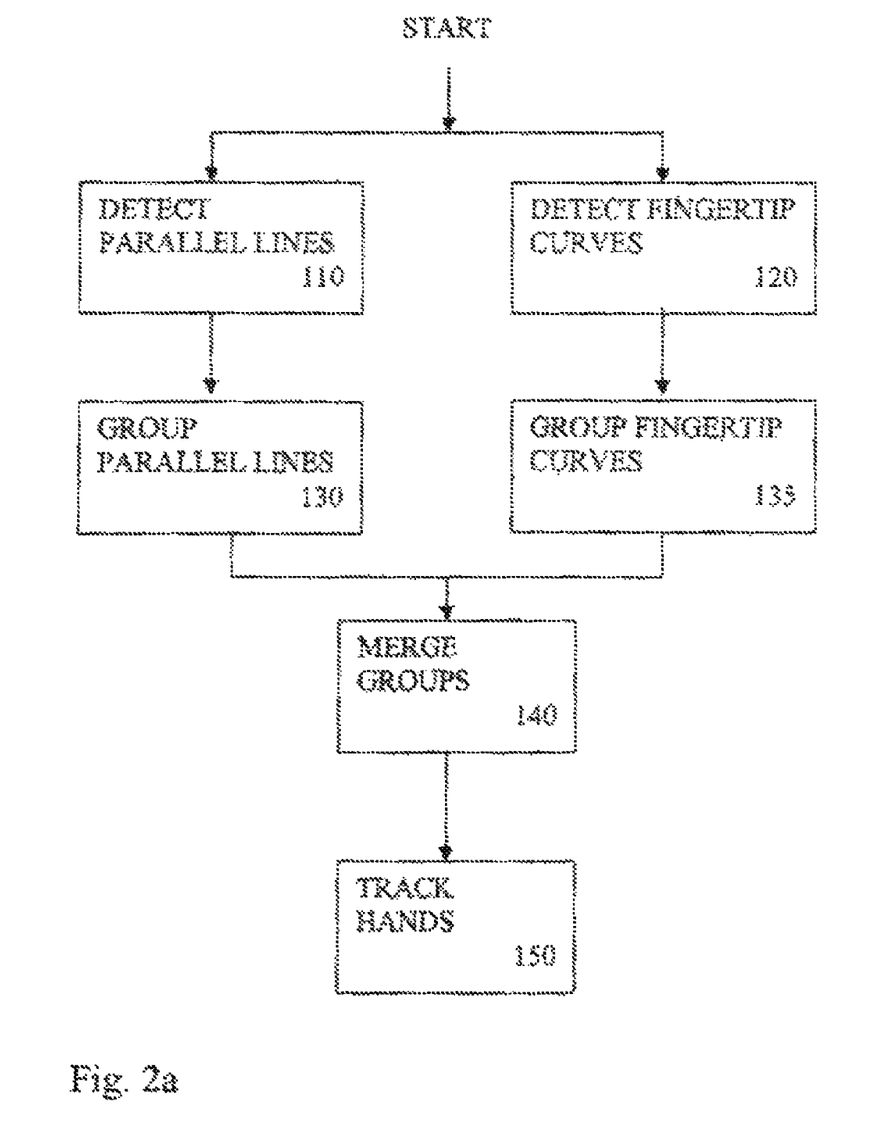
FIG. 2a is a flow diagram for identifying human hands in a video according to the present invention.

These two primitives are common to all open hands. As shown in the flow diagram of FIG. 2a, the steps in the hand 200 detection method of the present invention include step 110 for detection of parallel lines 210 and in step 120 where curved fingertips 220 are detected. The parallel lines 210 and the curved fingertips 220 are primitives 1 and 2, respectively. In step 130 parallel line 210 of primitives I are grouped and in step 135 fingertip curves 220 of primitives 2 are grouped, both are grouped according to respective decision trees. The groups of parallel lines 21(1 and fingertip curves 220 are merged in step 140 to find candidate hands 200.

Figure 3:
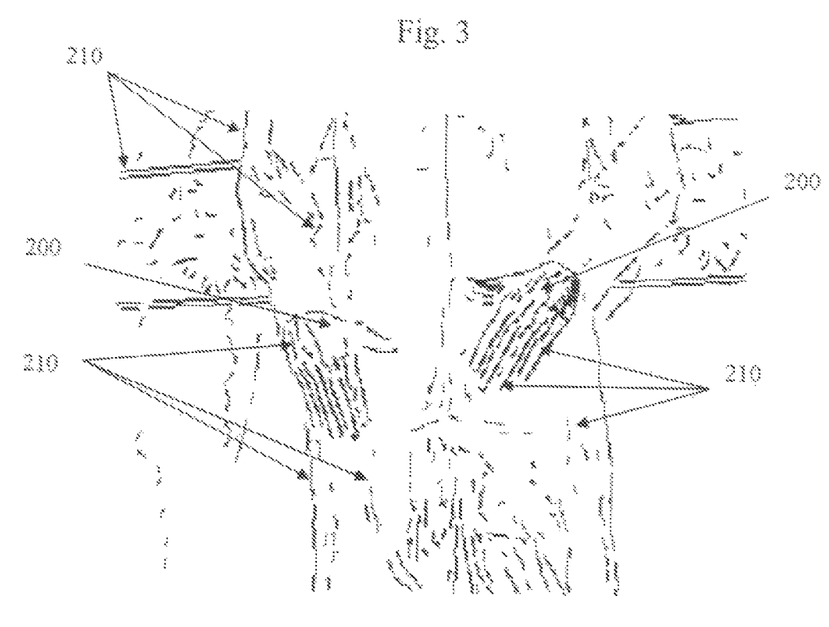
FIG. 3 shows areas of a frame that satisfy the bar criteria to be fingers of an open hand.

Step 110: Detection of Parallel Lines (Bars):

In order to identify the lines, the edges are first detected using the Canny edge detection in the given image. The next step is to identify the lines in the given image using the Burns line finding set of instructions which are both commonly to known to those skilled in the art. Two lines are parallel, if and only if, their slopes are similar. After finding a pair of parallel lines 210, numerous properties are extracted such as length, width, area, average chromaticity and color histogram about the area that falls between these two parallel lines. An example output of the line detection step 110 is shown in FIG. 3. As the final step in detection of the finger parallel lines 210, candidates that are too long or too short to be a finger segment are eliminated.

Step 120: Detection of Curved Fingertips (Curves):

The curved fingertip detection step 120 uses a variant of the person finding algorithm described in Garcia et al., Finding heads in single images, In Proc. Canadian Conf. Computer and Robot Vision, (2005) for finding the curved fingertips 220. This algorithm is a cropped version of prior art model described in T. Zhao and R. Nevatia, Stochastic human segmentation from a static camera, In Proc. IEEE work, Motion and Video Computing, pp. 9 14, (2002). As the first step in detecting curves, the model edges are extracted from each model. Neighboring pixels of the same orientation are grouped together and the middle point of each group is marked as a fingertip top candidate.

The next step is superimposing the models on each candidate in the test image. This process yields how good the match is between the model and the test area. If an ideal fingertip is superimposed on a fingertip candidate 220, the k pixels of this ideal fingertip's contour has coordinates $m_1, \ldots, m_k$ and unit normals $v_1, \ldots, v_k$. The score for a finger candidate is then given by the formula:

$$S(x,y)=(\Sigma e^{-0.25D(mi)}|v_i \cdot O(C(mi))|)/k \qquad (1)$$

where D(x, y) is the distance to the closest edge pixel from (x, y), C(x, y) is the closest edge pixel from (x, y) and O(x, y) is the unit gradient vector at the pixel (x, y).

Figure 4:
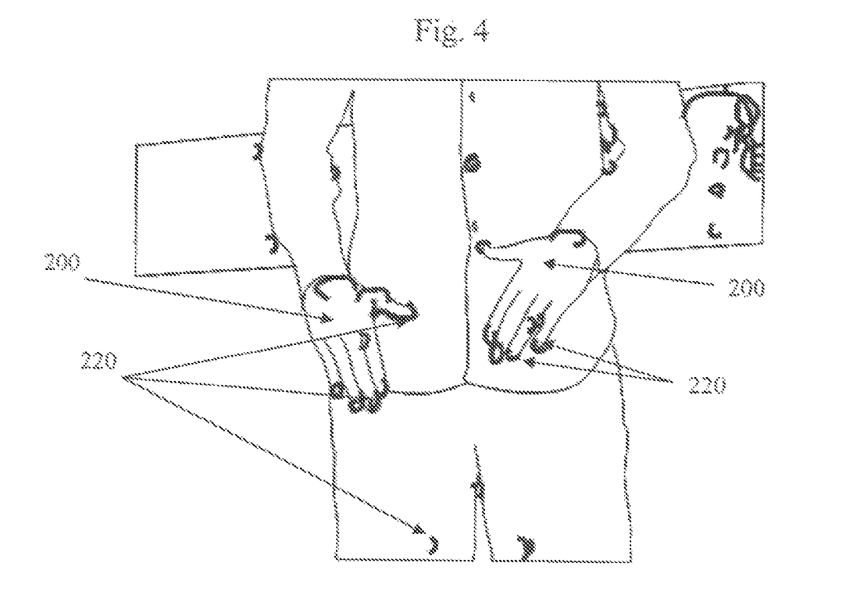
FIG. 4 shows areas of the frame shown in FIG. 3 that satisfy the curved finger-tip criteria to be fingers of an open hand.
Figure 5:
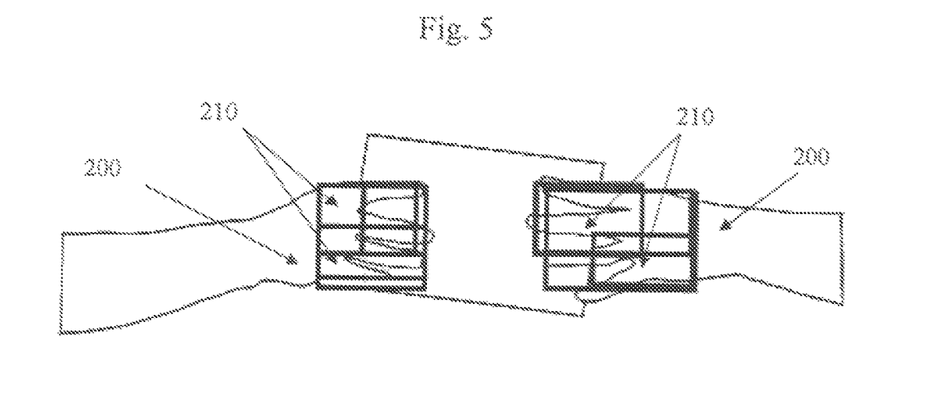
FIG. 5 shows an example of the output of merging groups of primitives, grouping of bars in this example, into hands.

In order to maintain the scale invariance, the models are scaled along each dimension, and every scaled model is matched to the candidate. If a model at a specific threshold scores more than other scales and surpasses a given threshold, then the corresponding candidate on which the model is superimposed is marked as a fingertip. The hand images in FIG. 4 show an example of an output of step 120.

Steps 130 and 135: Grouping Primitives

After finding finger parallel lines primitives and curved fingertip primitives, the parallel line 210 and curved fingertip 220 primitives are grouped together in steps 130 and 135 respectively, using decision trees trained separately for each primitive class, parallel bars and curved fingertips, based on the relative properties of these primitives. Relative properties are those properties defined in such a way that different responses at different scales are constant. This avoids using individual properties of primitives. To maintain the scale variance, the ratio of the distance between two parallel lines to the width of the thinner line or the ratio of the radius of the thinner fingertip to that of the wider fingertip can be used. These are example features that are invariant for different scales and used for building the decision trees.

The question that is propagated through the decision tree is, given two detected primitives, parallel lines and curved fingertips in this example, whether they can belong to the same hand or not. Due to the nature of decision trees, the answer to this question is binary 1/0 (yes/no). According to the present invention, the system employs two decision trees, one decision tree trained for each of the finger primitive classes, parallel lines and fingertip curves. Alternatively, additional primitive classes and corresponding decision trees can be used as long as a sound algorithm to merge the results is determined.

Figure 2B:
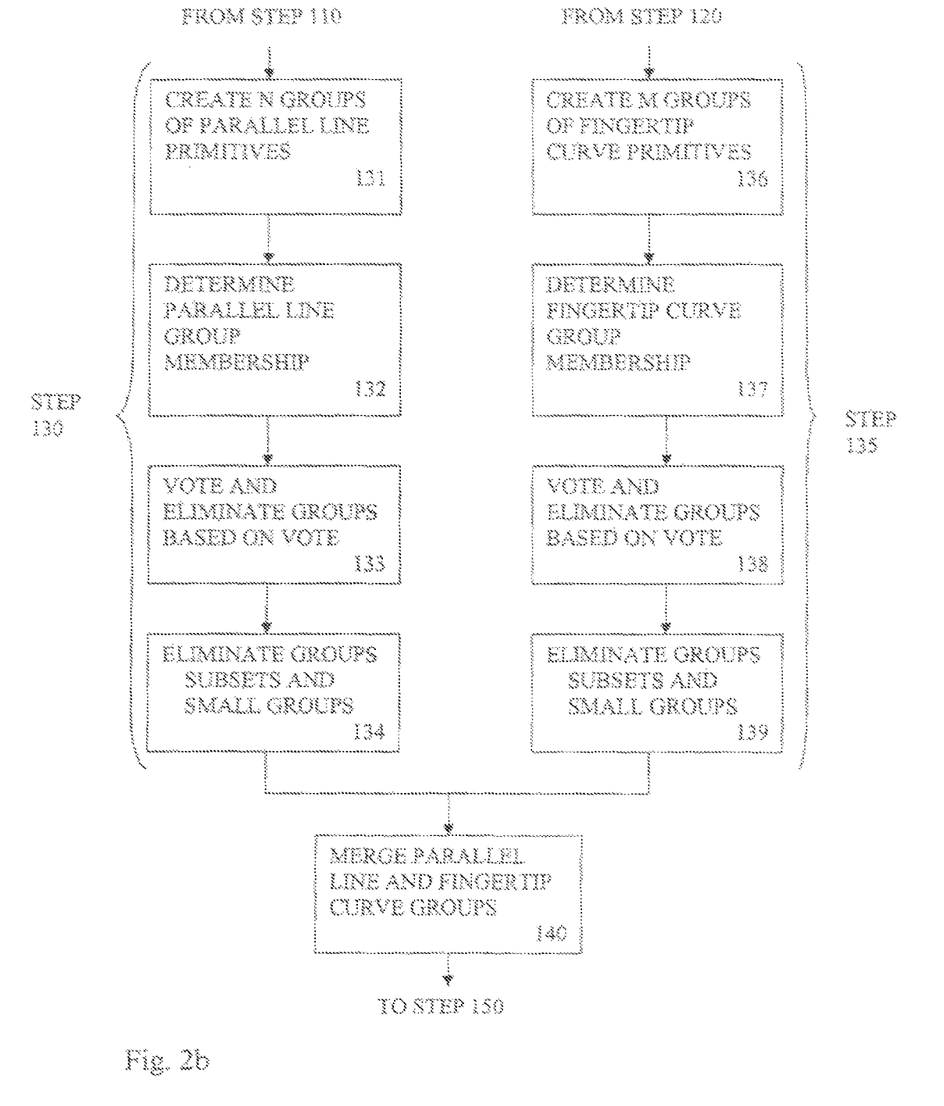

Once it is possible to correctly identify whether or not it is possible for two given detected primitives to belong to one hand, groups of primitives are formed. The grouping process for each finger primitive creates groups of primitives employing the specific tree for that primitive class. The parallel line grouping and fingertip curve grouping steps 130 and 135, respectively, are shown in FIG. 2b. As shown, in step 131 the detected parallel line primitives 210 from step 110 are grouped and in step 136 the detected fingertip curve 220 primitives from step 120 are grouped. If there are N bar primitives detected, N groups are formed in step 131 for the detected parallel line primitives. If there are M curve primitives detected, M groups are formed in step 136 for the detected curve primitive. Each bar primitive and each curve primitive is the representative of a different group.

For each single group created in steps 131 and 136, the membership of a specific primitive is determined by the decision from the decision tree used in steps 110 and 120 with respect to the group representative and the primitive in question. At the end of steps 132 and 137, each group has at least 1 member if no other primitive can be in the same hand as the representative and at most N or M members if all the other primitives can be in the same hand with the representative fingers, where N and M are the number of detected bars and curves respectively.

After forming the groups in steps 131 and 136 and determining membership in the groups in steps 132 and 137, a voting scheme is employed in steps 133 and 138 to eliminate primitives that do not get the majority vote within each group. Next, in steps 134 and 139, groups that have at least one superset are eliminated and groups that have less than 3 primitives are discarded. An example output of this grouping steps is shown in FIG. 4. This representation is intermediate and shows the grouping of parallel lines 210 into hands 200.

Step 140: Merging Groups of Primitives

Figure 6:
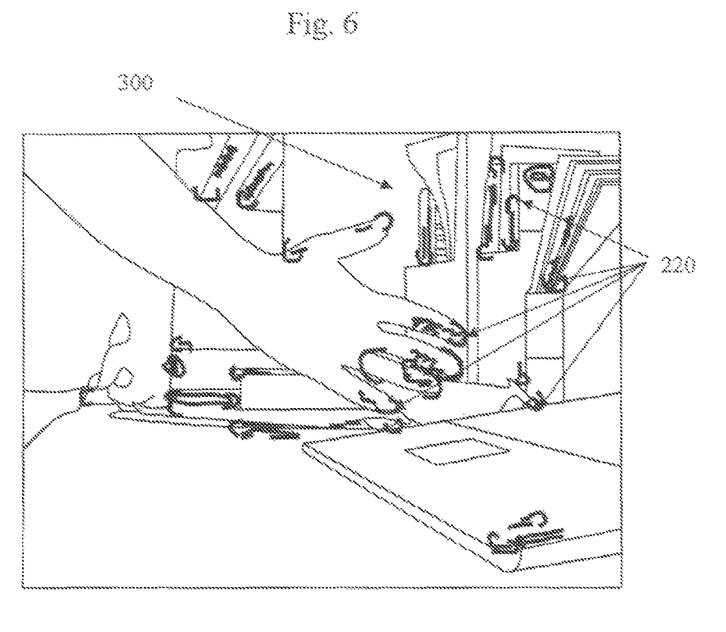
FIG. 6 shows areas detected in a frame that satisfy the parallel line criteria as fingers of an open hand.

The grouping steps yield candidate hand locations for each primitive class. As shown in FIG. 6, each candidate hand is marked with a rectangle. First, assume that the $c^{th}$ group from finger primitive class $p_i$ is called $p_{ic}$. In other words, the detected members of primitive class $p_i$ in the test image is $p_{i1}$ through $p_{in}$, where n is the number of groups that are found in steps 131 and 136, for primitive class $p_j$, the detected primitives from the grouping process will be $p_{j1}$ through $p_{jm}$, where m is the number of groups that results from grouping, and so on. As many groupings of primitives as necessary can be denoted in this manner. The present invention uses two primitive classes, bars (parallel lines) ($p_1$) and fingertip curves ($p_2$). When comparing group f from $p_1$ to group g from $p_2$ to get a measure of how good a match f and g are, the present invention uses the scoring function:

$$\text{score}(f,g) = (\text{no Intersections}(f,g)^2)/(\text{widthDif} f(f,g)^2 + 1) \quad (2)$$

where no Intersections and widthDif f are as follows:

$$noIntersections(f, g) = \sum_{r \in f} \sum_{p \in g} intersects(r, p) \quad (3)$$

where intersects(r,p) is a binary function that returns 1 if the bar r intersects the fingertip curve p, and returns 0 otherwise.

Although a bar (set of parallel lines) can intersect a curve in a manner suggesting the existence of a finger, there is yet another test that needs to be done. The bar might be too small for the curve and vice versa. The widthDif f(f,g) is given by the formula $$widthDiff(f, g) = \sum_{r \in f} \sum_{p \in g} intersects(rp) diff(r, p) \quad (4)$$

where di f f(r,p) gives the absolute difference between the width of the bar r and the diameter of the curve p.

If the score obtained from (2) is large enough for two groups f and g, they are merged into the smallest rectangle that can contain rectangles representing both f and g.

Step 150: Hand Tracking

Figure 2C:
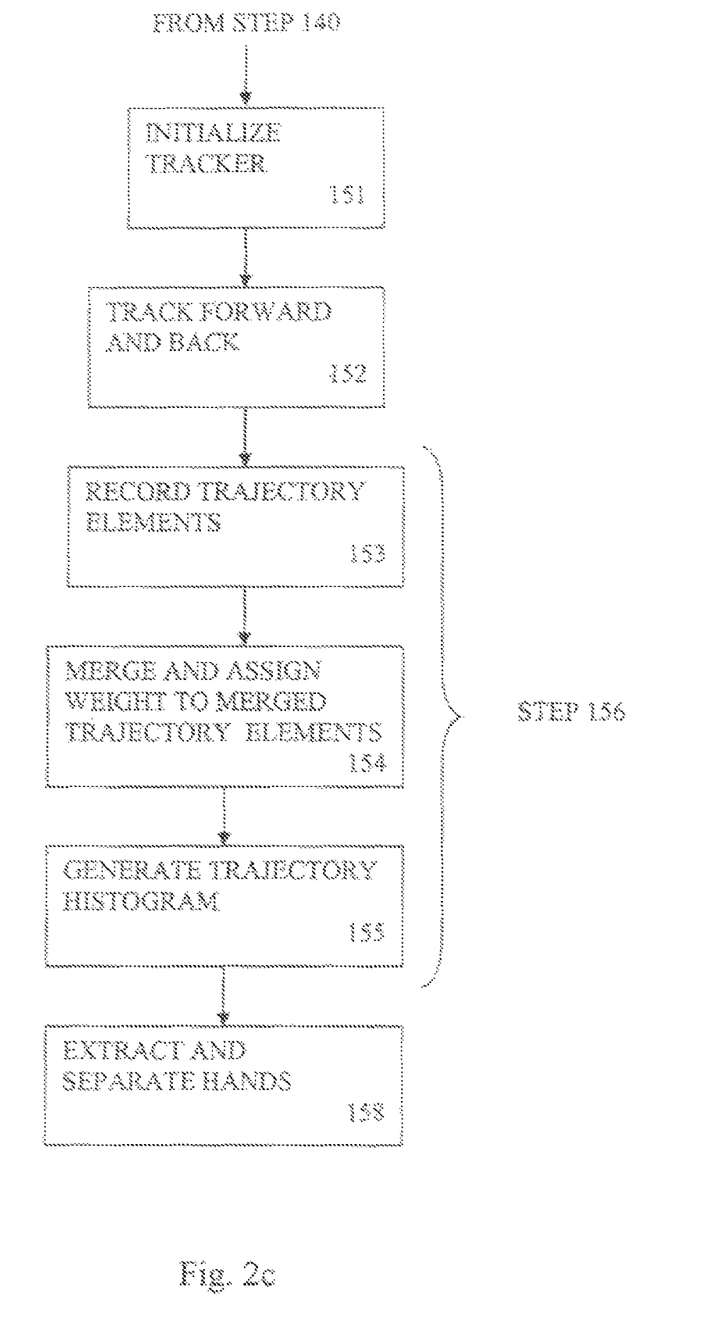
FIG. 2c is a flow diagram of the steps for tracking a hand in a video.

In this step, the novel tracking technique of the present invention is applied to hand tracking. This technique makes use of motion information that can be obtained from a video. FIG. 2c is a flow diagram showing the steps in the track hand step 150, at each frame, a tracker is initialized in step 151 at all the hand locations found in the merged group step 140 for that specific frame. In step 152 that candidate hand is then tracked forward and backward in time. The location data from step 152 is record in step 153 to obtain a complete trajectory throughout the whole video in step 156 using a mean shift tracker described by Comaniciu and Meer which is initialized at the detection rectangle.

Assume this trajectory is called T(f, h), where f denotes the frame number the hand was found in, and h denotes the hand ID in that frame. Then this trajectory is composed of so called trajectory elements T(f, h, m):

$$T(f,h,m) = T(f,h,l), \ldots, T(f,h,ni), \ldots, T(f,h,M) \quad (5)$$

where M is the number of frames in the video and $1 \leq m \leq M$. Each trajectory element represents an (x,y) location of the image.

It is assumed that the trajectories of the correct hands will be consistent throughout the video. False positives will not appear in all the frames; those that do appear will be static or in the background. Using this fact, in step 154 similar trajectories are merged, increasing their weight and choosing the trajectories that have the highest weights in step 156 to determine the hand trajectory in the end.

The average distance between two trajectories is defined as:

$$\frac{\sum_{m=1}^{M} T_1(m) - T_2(m)}{M} \quad (6)$$

where $T_i(m)$ denotes the (x,y) location of the trajectory at frame m, and the difference operator is the Euclidian distance between two points and M is defined to be the number of frames. Two trajectory elements $T_1(j)$ and $T_2(j)$ are called sufficiently close if $$\left| (T_1(j) - T_2(j)) - \frac{\sum_{m=1}^{M} T_1(m) - T_2(m)}{M} \right| \leq t \quad (7)$$

where t is a user defined threshold. In this example, t is set to 5 pixels. Two trajectories are merged if 50% of their respective trajectory elements are sufficiently close. When two trajectories are merged in step 154, the resulting trajectory $T_n$ is:

$$Tn = \frac{T_1(1) - T_2(1)}{2} \ldots \frac{T_1(M) - T_2(M)}{2} \quad (8)$$

Figure 7:
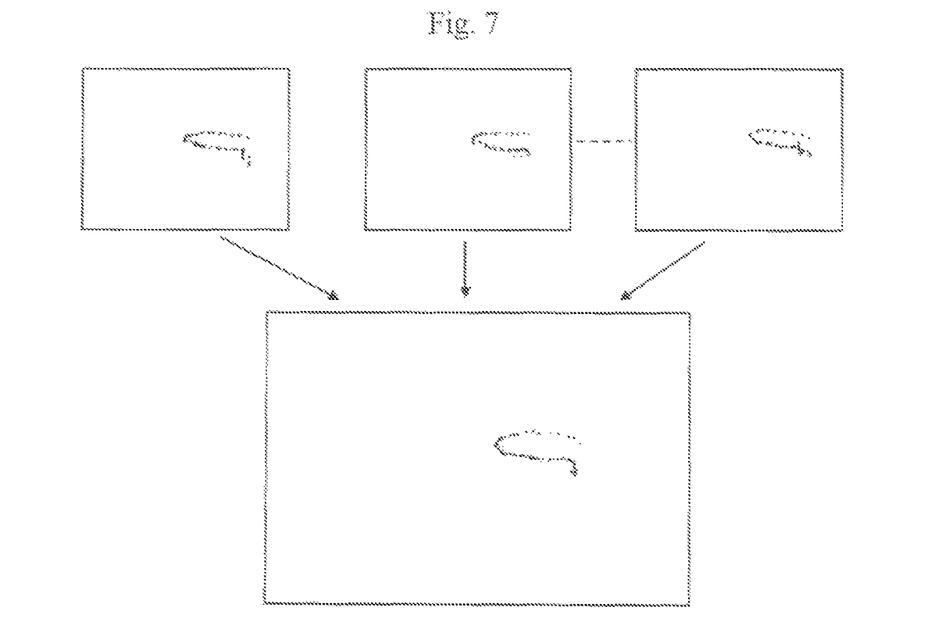
FIG. 7 is a block diagram showing three trajectories that are merged into one trajectory showing a hand entering and exiting the scene from the right.

In step 154 when two trajectories are merged, their weights are added and this value becomes the weight of the new trajectory. Correct trajectories tend to accumulate and at the end have very high weights as shown by the merged groups shown in FIG. 7. After finding the correct trajectories, hands are segmented out using the trajectory histogram. For each hand in the detection phase, bar and curve histograms are created and merged with a detection is marked. Since the histogram is built for each hand in the detection phase, when merging trajectories, the respective histograms are merged to end up with a trajectory histogram in step 155. Using the center of the hand location as the seed, the hands are successfully extracted and separated at a scene in step 157 using a connected components algorithm.

If background subtraction is used, the largest connected component that is left and moving in the scene would be marked as the object. From that point, it is trivial to establish which hand is holding the object at a given time by comparing the velocity vectors of the objects to that of the detected hands in the scene. A velocity vector of an object between frames is found by subtracting the initial location from the final location to obtain the distance the hand traveled and dividing the distance by the number of frames elapsed to traverse this distance.

Figure 2D:
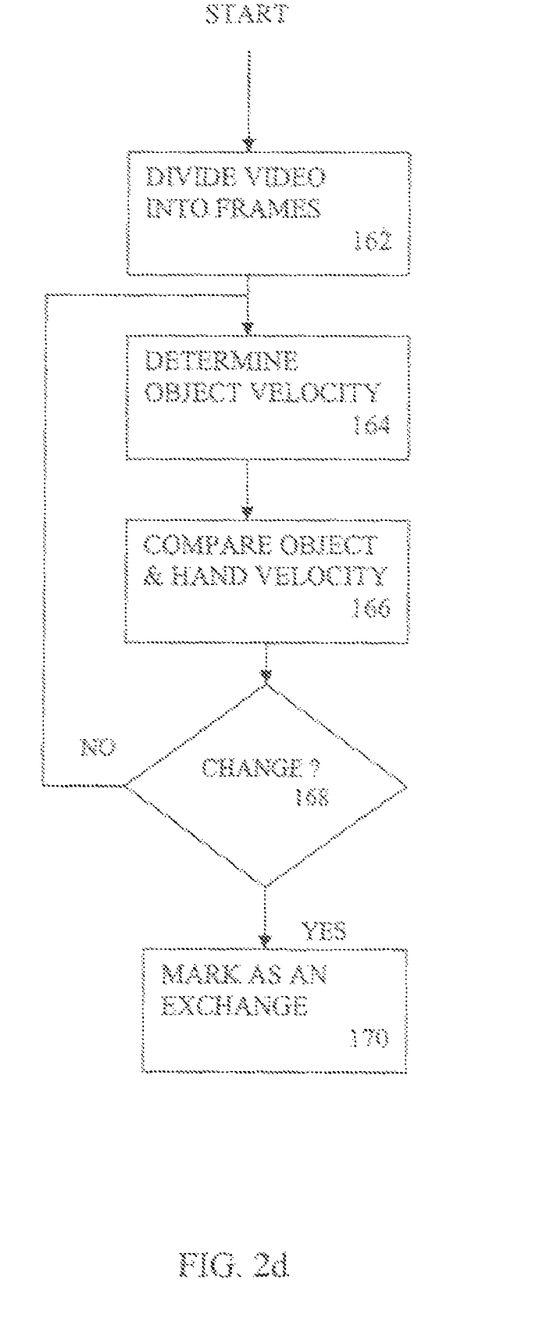
FIG. 2d is a flow diagram of the steps for determining an exchange of an object.
Figure 8:
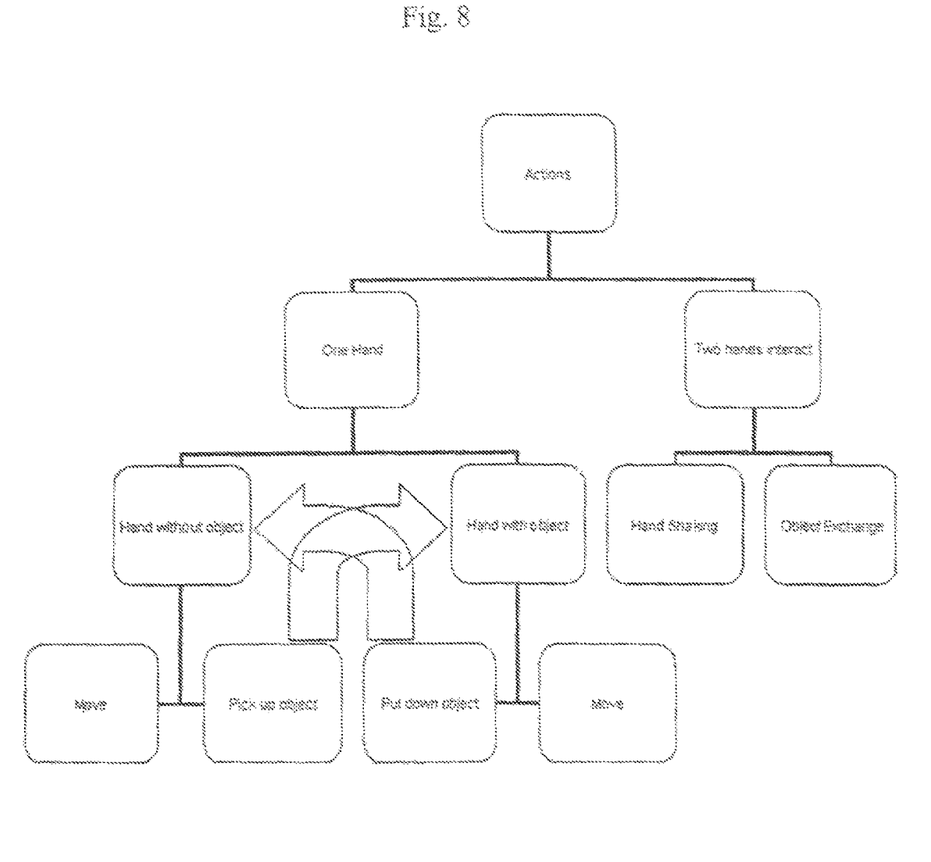
FIG. 8 is a flow diagram showing possible actions detectable by the present invention.

As an example, to understand the action of an object in a hand given to another (exchange), the steps shown in the Flow diagram of FIG. 2d are used. At step 162, the video is divided into intervals of 5 frames or longer. In step 164, for each interval, the object velocity is determined and in step 166 the object velocity is compared to each hand velocity to see which hand is more likely to carry the object. Then, in step 168, if at one point the object changes hands, in step 170 it is marked as an exchange. The present invention provides a tree of actions that can be determined in this framework. When two hands interact in, either the two hands are shaking or an object is being exchanged. When on hand is detected, the hand may or may not include an object. For the hand without an object, the choices are either move the object or pick up an object. Once the objected is picked up, it become a hand with an object. For the hand with the object, the object can be moved or the object can be put down which moves the tracking back to being a hand without an object. The object is tracked from frame to frame following the flow diagram shown in FIG. 8.

The methods and systems according to the present invention were tested on ten (10) videos producing good results. Among the ten tested sequences, five were simple hand detection and tracking, while the rest were hands exchanging objects. In the five simple tracking cases, the hands were successfully detected and tracked through the sequences. No initialization or re-initialization was required during the detection process.

The results for the exchange scenes were also satisfactory. For the correct detection of an object exchange taking place at the scene, simple background subtraction is required to identify the object. In two out of five sequences, there were rare cases where the hand and object were mislabeled. The reason for this phenomenon in the sample cases is the similarity of the color distribution of the hand and the object.

The methods and systems of the preferred embodiment were also tested in dimly lit scenes, where the hand contours and details are not clearly visible. The loss of detail due to poor illumination affects the detection rate by reducing the probability of the hand primitives being found. Although this was the outcome in the experiments, there was little or no degradation in the tracking quality. Even if the tracker fails initiating from a single frame, other trackers that initiated from different frames compensated for the incorrect tracking.

In summary, the present invention provides novel tracking methods and systems with application to the hand tracking problem. Since the human hand has many degrees of freedom, it has been difficult to apply common detection and recognition techniques to hands. Instead, we detect what we term "finger primitives" and group these primitives to obtain the hands in the scene. Decision trees provide refinement of the grouping into hands. In the example shown and described, results with two primitive classes are illustrated.

The present tracking technique is not only a tracking application, but also can be used as an auxiliary system to eliminate false positives for weak detectors like the hand detector described in this system. The result of the tracking is used to detect the missed detections and to eliminate false positives.

This type of tracking is not limited to hand tracking. In fact any articulated object that can be identified by the detector is a candidate. Moreover, once the system gathers enough information about the track the hand is most likely to follow, it can extract the hand, therefore eliminating false positives. A proposed extension to the system is using a specialized tracking for the hand, instead of using mean shift. Although mean shift is superior to most of the generic tracking systems, its performance is low when applied to an articulated object. The information that is gathered in the detection steps can be utilized to improve the tracking.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for detection and tracking of a moving object comprises the steps of:
    detecting at least two primitive classes for identifying the moving object within plural frames of video to generate plural primitive candidates for each class by
        detecting plural primitive candidates for each of the at least two primitive classes;
        extracting a primitive model of each of the at least two primitive classes;
        superimposing the primitive model on each primitive candidate; and
    determining which primitive candidate is a primitive;
    grouping each detected primitive candidates in each class separately according to a decision tree corresponding to each primitive class;
    training the decision tree corresponding to the primitive class;
    merging primitive groups for each class of primitives to identify the object being tracked; and
    tracking the moving object through the plural frames of video according to the merged primitive groups.

2. The method of claim 1, wherein the grouping step comprises the steps of:
- creating one group for each detected primitive in each class to generate plural groups of primitive candidates for each of the at least two primitive classes using the decision tree that is trained corresponding to the primitive class;
- determining group membership of each of the plural groups from the plural primitive candidates detected in the detecting step;
- voting to eliminate primitive groups based on voting results; and
- eliminating subset groups and small groups to reduce false primitive positives, wherein the grouping step yields primitive candidate locations for each primitive class.

3. The method of claim 2, wherein the creating one group for each detected primitive candidate_step comprises the step of:
- forming N groups when there are N primitives detected for a given primitive class, wherein each detected primitive is a representative of a different primitive group.

4. The method of claim 1, wherein the primitive group merging step comprises the steps of:
- merging primitive groups of a first class with primitive groups of a second class; and
- determining which merged first and second class groups include the object.

5. The method of claim 1, wherein tracking the object through the plural frames of video comprises the steps of:
- tracking the moving object forward and backward through each of plural sets of video frames to obtain plural trajectories of the object;
- recording each of the plural trajectories;
- merging the plural trajectories;
- assigning weights to each of the merged trajectories;
- generating a trajectory histogram from the merged trajectories; and
- extracting and separating the moving object from the trajectory histogram.

6. A system for identifying and tracking a human hand in a video comprising:
- a video device for generating plural frames of video;
- a processor for executing instructions;
- a set of detecting instructions for detecting the human hand in the video comprising:
  - a parallel line set of instructions for detecting parallel line primitives;
  - a curved fingertip set of instructions for detecting curved fingertip primitives;
  - a grouping set of instructions for grouping the plural detected parallel line primitives and plural curved fingertip primitives according to a parallel line decision tree and a curved fingertip decision tree, respectively; and
  - a merging set of instructions for merging the parallel line groups and the curved fingertip groups to identify candidate hands; and
- a set of tracking instructions for tracking the human hand through the plural frames of video.

7. The system of claim 6, wherein the parallel line set of instructions for detecting parallel lines comprises:
- a first subset of parallel line instructions for detecting plural lines in an image;
- a second subset of parallel line instructions for determining if two of the plural lines are parallel to generate plural pairs of parallel lines;
- a third subset of parallel line instructions for determining plural properties of each pair of parallel lines; and
- a fourth subset of parallel line instructions for eliminating pairs of parallel lines that are not candidates for fingers according to the plural properties.

8. The system of claim 6, wherein the curved fingertip set of instructions for detecting curved fingertips comprises:
- a first subset of curved fingertip instructions for extracting a model edge from a fingertip model;
- a second subset of curved fingertip instructions for grouping together neighboring pixels having a same orientation for each fingertip group;
- a third subset of curved fingertip instructions for marking a middle point of each curved fingertip group as a fingertip top candidate;
- a fourth subset of curved fingertip instructions for superimposing the fingertip model on each fingertip top candidate in the image;
- a fifth subset of curved fingertip instructions for scaling each fingertip model;
- a sixth subset of curved fingertip instructions for matching each fingertip top candidate to the scaled fingertip model; and
- a seventh subset of curved fingertip instructions for marking each fingertip top candidate as a fingertip when the matching to the superimposed fingertip model surpasses a threshold.

9. The system of claim 6, wherein the grouping set of instructions for grouping the plural detected parallel lines and plural curved fingertips comprises:
- a first subset of grouping instruction for creating one group for each detected parallel line and each detected curved fingertip to generate plural parallel line groups and plural curved fingertip groups;
- a second subset of grouping instruction for determining group membership of each of the plural parallel line groups and plural curved fingertip groups according to the parallel line decision tree and the curved fingertip decision tree, respectively;
- a third subset of grouping instruction for voting to eliminate parallel line groups and curved fingertip groups based on voting results; and
- a fourth subset of grouping instruction for eliminating subset groups and small groups to reduce false primitive positives, wherein the grouping step yields parallel line candidate locations and curved fingertip candidate locations.

10. The system of claim 6, wherein the merging set of instructions for merging the parallel line group and the curved fingertip groups to identify candidate hands comprises:
- a first subset of merging instructions for detecting intersections between the merged parallel line groups and curved fingertip groups; and
- a second subset of merging instructions for determining which intersecting parallel line groups and fingertip groups are finger candidates.

11. The system of claim 6, wherein the tracking set of instructions for tracking the detected human hand comprises:
- a first subset of tracking instruction for tracking the human hand forward and backward through each of plural sets of video frames to obtain plural trajectories of the human hand;
- a second subset of tracking instruction for recording each of the plural trajectories;
- a third subset of tracking instruction for merging the plural trajectories;

a fourth subset of tracking instruction for assigning a weight to each of the merged trajectories;

a fifth subset of tracking instruction for generating a trajectory histogram from the weighted trajectories; and a sixth subset of tracking instruction for extracting and separating the human hands from the trajectory histogram.

12. The system of claim 6, further comprising:
a set of object detection instructions for detecting an object carried in one of the detected human hands.

13. The system of claim 12, further comprising:
a set of object tracking instructions for tracking a transfer of the detected object from one detected human hand to another detected human hand.

14. A method for detection and tracking of moving hands in a video comprises the steps of:
   detecting parallel line primitives in plural frames of the video to generate plural parallel line primitives by detecting plural lines in an image;
      determining when two of the plural lines are parallel to generate plural pairs of parallel lines;
      determining plural properties of each pair of parallel lines; and
      eliminating pairs of parallel lines that are not candidates for fingers according to the properties;
   detecting curved fingertip primitives in plural frames of the video to generate plural curved fingertip primitives;
   grouping each parallel line primitives according to a parallel line decision tree;
   grouping each curved fingertip primitive according to a curved fingertip decision tree; and
   merging parallel line groups and curved fingertip groups to identify the moving hand; and
   tracking the moving hand through the plural frames of video according to the merged primitive groups.

15. The method of claim 14, wherein the detecting curved fingertip primitives step comprises the step of:
   extracting a model edge from a fingertip model;
   grouping together neighboring pixels having a same directional orientation for each curved fingertip group;
   marking a middle point of each pixel group as a fingertip top candidate;
   superimposing the fingertip model on each fingertip top candidate in the image;
   scaling each fingertip model along at least one fingertip model dimension;
   comparing each fingertip top candidate to the scaled fingertip model; and
   marking each fingertip top candidate as a fingertip when the comparison of the scaled superimposed fingertip model with the fingertip top candidate surpasses a threshold.

16. The method of claim 14, wherein the merging step further comprises the steps of:
   detecting intersections between the merged parallel line groups and merged curved fingertip groups; and
   determining which intersecting parallel line groups and curved fingertip groups are a finger.

17. The method of claim 14, further comprising the steps of:
   detecting an object in one of the hands;
   dividing the video into intervals of 5 frames or longer;
   determining the object velocity during each interval;
   comparing the object velocity to each hand velocity to determine which hand is more likely to carry the object; and
   marking one of the 5 or more frames as an exchange of the object when the object changes hands in the frame.

18. The method of claim 17, wherein the tracking step comprises the step of:
   tracking the object forward and backward through each of plural sets of video frames to obtain plural trajectories of the object;
   recording each of the plural trajectories;
   merging the plural trajectories;
   assigning weights to each of the merged trajectories;
   generating a trajectory histogram from the merged trajectories; and
   extracting and separating the hands from the trajectory histogram.

19. The method of claim 18, further comprising the steps of:
   (a) determining how many hands are detected in each set of video frames;
   (b) when two hands are detected,
      determining if the two hands interact;
      (c) when two hands are interacting,
         determining if the two hands are shaking; and
         determining if an object is detected or object is being exchanged;
   (d) when one hand is detected,
      determining if the one detected hand includes the object;
      (d) when the object is detected with the hand;
         determining if the hand is moving the object;
         determining if the hand is putting the object down; and
         repeating step (d) when the object is put down;
      (e) when the object is not detected with the hand; and
         determining when the object is picked up by the hand; and
         going to step (d) when the object is picked up;
   repeating steps (a) through (e) for a next set of video frames.

* * * * *